United States Patent
Oba et al.

(10) Patent No.: US 9,397,465 B2
(45) Date of Patent: Jul. 19, 2016

(54) FIBER LASER DEVICE

(71) Applicant: FUJIKURA LTD., Tokyo (JP)

(72) Inventors: Yasuhiro Oba, Sakura (JP); Michihiro Nakai, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/338,095

(22) Filed: Jul. 22, 2014

(65) Prior Publication Data

US 2015/0318660 A1     Nov. 5, 2015

Related U.S. Application Data

(63) Continuation of application No. PCT/JP2012/051457, filed on Jan. 24, 2012.

(51) Int. Cl.
| | |
|---|---|
| *H01S 3/30* | (2006.01) |
| *H01S 3/067* | (2006.01) |
| *H01S 3/08* | (2006.01) |
| *H01S 3/094* | (2006.01) |
| *H01S 3/11* | (2006.01) |
| *H01S 3/0941* | (2006.01) |
| *H01S 3/10* | (2006.01) |

(Continued)

(52) U.S. Cl.
CPC ............ *H01S 3/0675* (2013.01); *H01S 3/06* (2013.01); *H01S 3/067* (2013.01); *H01S 3/06754* (2013.01); *H01S 3/08013* (2013.01); *H01S 3/09415* (2013.01); *H01S 3/094003* (2013.01); *H01S 3/094007* (2013.01); *H01S 3/094042* (2013.01); *H01S 3/094049* (2013.01); *H01S 3/094076* (2013.01); *H01S 3/10007* (2013.01); *H01S 3/10038* (2013.01); *H01S 3/117* (2013.01); *H01S 3/1121* (2013.01);

(Continued)

(58) Field of Classification Search
CPC .... H01S 3/067; H01S 3/0675; H01S 3/06754; H01S 3/08013; H01S 3/094003; H01S 3/094007; H01S 3/094042; H01S 3/094049; H01S 3/109; H01S 3/1121
USPC .................................................. 372/6, 13, 22
See application file for complete search history.

(56) References Cited

U.S. PATENT DOCUMENTS

| | | |
|---|---|---|
| 6,901,090 B1 | 5/2005 | Ohtsuki |
| 2004/0105615 A1* | 6/2004 | Okuno ................... G02F 1/3536 385/16 |

(Continued)

FOREIGN PATENT DOCUMENTS

| | | |
|---|---|---|
| JP | 2004-110020 A | 4/2004 |
| JP | 2004-337970 A | 12/2004 |

(Continued)

OTHER PUBLICATIONS

International Search Report dated Feb. 28, 2012, issued in corresponding application No. PCT/JP2012/051457.

*Primary Examiner* — Kinam Park

(74) *Attorney, Agent, or Firm* — Westerman, Hattori, Daniels & Adrian, LLP

(57) ABSTRACT

In a case where the period from the input of the output suspension instruction to the next output instruction is shorter than the fixed period of time, the seed laser light source and the pumping light source are in a pre-pumped state during the period from the end of the output state to the start of the next output state. In a case where the period from the input of the output suspension instruction to the next output instruction is longer than the fixed period of time, the seed laser light source and the pumping light source are in the pre-pumped state only for the fixed period of time from the input of the output instruction.

6 Claims, 5 Drawing Sheets

(51) Int. Cl.
*H01S 3/117* (2006.01)
*H01S 3/23* (2006.01)
*H01S 3/06* (2006.01)
*H01S 3/109* (2006.01)

(52) U.S. Cl.
CPC .................. H01S 3/23 (2013.01); H01S 3/302 (2013.01); H01S 3/109 (2013.01); H01S 3/10069 (2013.01)

(56) References Cited

U.S. PATENT DOCUMENTS

| | | |
|---|---|---|
| 2010/0135340 A1 | 6/2010 | Kitabayashi |
| 2010/0183040 A1 | 7/2010 | Ishizu et al. |
| 2012/0163402 A1* | 6/2012 | Oba .................... H01S 3/06754 372/6 |
| 2012/0263198 A1* | 10/2012 | Oba ...................... H01S 3/2308 372/6 |
| 2013/0034113 A1* | 2/2013 | Oba ...................... H01S 3/0675 372/6 |

FOREIGN PATENT DOCUMENTS

| | | |
|---|---|---|
| JP | 2007-234943 A | 9/2007 |
| JP | 2008-91773 A | 4/2008 |
| JP | 2010-171131 A | 8/2010 |
| JP | 2010-234444 A | 10/2010 |
| WO | 01/20398 A1 | 3/2001 |
| WO | 2009/001852 A1 | 12/2008 |
| WO | 2011/004806 A1 | 1/2011 |
| WO | 2011/055812 A1 | 5/2011 |
| WO | 2011/111560 A1 | 9/2011 |

* cited by examiner

FIBER LASER DEVICE

TECHNICAL FIELD

The invention relates to a fiber laser device.

BACKGROUND ART

In recent years, fiber laser devices have been used in processing machines for performing processing with laser light, medical devices such as surgical knives using laser light, and the like. In a fiber laser device, laser light generated from a laser oscillator and pumping light are incident on an amplification optical fiber, and the amplified laser light is emitted from an output unit.

In such a fiber laser device, a certain period of time is required for the intensity of laser light to be stabilized from when the laser light is started to be emitted from the fiber laser device. That is, a certain period of time is required for laser light to rise.

As the rise time of laser light becomes shorter, the work efficiency becomes higher. Patent Document 1 listed below discloses a fiber laser device that requires a short period of time to stabilize the intensity of laser light.

In the fiber laser device disclosed in Patent Document 1 listed below, pumping light with a low and constant intensity is incident on an amplification optical fiber during the periods other than the periods during which laser light is emitted from the fiber laser device, and a rare-earth element doped in the amplification optical fiber is pumped. That is, pre-pumping is performed during the periods other than the periods during which laser light is emitted from the fiber laser device. When laser light is emitted from the fiber laser device, seed laser light and pumping light with a high intensity are incident on the amplification optical fiber, and amplified laser light is emitted. In this manner, when laser light is emitted from the fiber laser device, the rare-earth element in the amplification optical fiber is pumped by pre-pumping. Accordingly, the rise time of the laser light emitted from the fiber laser device is short (Patent Document 1).

CITATION LIST

Patent Document

Patent Document 1: JP-A-2008-91773

SUMMARY OF INVENTION

Objects to be Achieved by the Invention

In the fiber laser device disclosed in Patent Document 1 listed above, the rise time of laser light is short. However, when the level of the pumped state of the rare-earth element in the amplification optical fiber becomes too high during a pre-pumping period, oscillation occurs, and unnecessary light having a high crest value is emitted in some cases. If unnecessary light having a high crest value is emitted, unnecessary laser light with a high intensity is emitted onto a processed object or the like to be subjected to laser light, and the processed object or the like might be damaged.

In view of those circumstances, the invention aims to provide a fiber laser device that can suppress emits of unnecessary light having high crest values during the periods other than the periods during which laser light is emitted, while shortening the rise time of the laser light to be emitted.

Means for Achieving the Objects

A fiber laser device of the invention includes: a seed laser light source that emits seed laser light; a pumping light source that emits pumping light; an amplification optical fiber that receives the seed laser light and the pumping light, amplifies the seed laser light, and emits laser light, the amplification optical fiber being doped with a rare-earth element to be pumped by the pumping light; an output unit that emits the laser light that is emitted from the amplification optical fiber; a control unit that controls at least the seed laser light source and the pumping light source; and an instruction unit that inputs an output instruction and an output suspension instruction to the control unit, the output instruction being for causing the output unit to emit the laser light, the output suspension instruction being for causing the output unit to stop emitting the laser light. The seed laser light source and the pumping light source are put into an emitted state after a fixed period of time elapses from the time when the output instruction is input to the control unit, and the emitted state is ended after the fixed period of time elapses from the time when the output suspension instruction is input to the control unit, the fixed period of time being set beforehand. When the period from the time when the output suspension instruction is input to the control unit to the time when the next output instruction is input to the control unit is shorter than the fixed period of time, the seed laser light source and the pumping light source are in a pre-pumped state during the period from the end of the emitted state to the next emitted state. When the period from the time when the output suspension instruction is input to the control unit to the time when the next output instruction is input to the control unit is longer than the fixed period of time, the seed laser light source and the pumping light source are in a suspended state during the period from the end of the emitted state to the time when the next output instruction is input to the control unit, and are in the pre-pumped state during the period from the time when the output instruction is input to the control unit to the next emitted state. In the pre-pumped state, the seed laser light is not input to the amplification optical fiber, and the pumping light with a predetermined intensity is incident on the amplification optical fiber. In the emitted state, the seed laser light is incident on the amplification optical fiber to cause the output unit to emitted the laser light, and the pumping light is incident on the amplification optical fiber. The fixed period of time, in the pre-pumped state, is shorter than the period from the time when the pumping light with the predetermined intensity is incident on the amplification optical fiber to the time when the gain of a resonator of the fiber laser device becomes positive.

In such a fiber laser device, pre-pumping for entering pumping light with a predetermined intensity to the amplification optical fiber is performed prior to an emitted state. Accordingly, the rise time of laser light can be shortened. Also, the period of the pre-pumped state is shorter than the period from the time when the pumping light with the predetermined intensity is incident on the amplification optical fiber to the time when the gain of the resonator of the fiber laser device becomes positive. Accordingly, the fiber laser device can be prevented from oscillating. Thus, emits of unnecessary light with high crest values can be suppressed during the periods other than the periods during which laser light is emitted.

Also, in a case where the period from an output suspension instruction to the next output instruction is longer than the fixed period of time, the seed laser light source and the pumping light source are in the pre-pumped state only during the fixed period from the time when an output instruction is input to the time when the emitted state is established. That is, the seed laser light source and the pumping light source are in a suspended state, instead of the pre-pumped state, during the period from the end of the emitted state prior to the input of the output instruction to the input of the output instruction, and are in the pre-pumped state only during the fixed period from the input of the output instruction to a time-shift. The fixed period of time of the pre-pumped state is shorter than the period from the time when the pumping light in the pre-pumped state is incident on the amplification optical fiber to the time when the gain of the resonator of the fiber laser device becomes positive. As the seed laser light source and the pumping light source are in the pre-pumped state for the fixed period of time, the rise time of laser light in the emitted state can be shortened. Further, as the gain of the resonator of the fiber laser device does not become positive in the pre-pumped state, unintended oscillation is suppressed, and emits of unnecessary light with high crest values can be suppressed. In a case where the period from the output suspension instruction to the next output instruction is shorter than the fixed period of time, on the other hand, the seed laser light source and the pumping light source are in the pre-pumped state during the period from the end of the emitted state to the start of the next emitted state. As the pre-pumping is performed even when the intervals between emitted states are short, the rise time of laser light in the emitted states can be shortened. With this fiber laser device of the invention, emits of unnecessary light with high crest values can be suppressed during the periods other than the laser light emitted periods, while the rise time of laser light to be emitted is shortened.

The above fiber laser device preferably further includes: a wavelength converter that performs no wavelength conversion on the light generated and emitted from the amplification optical fiber by the pumping light in the pre-pumped state, and performs wavelength conversion on the laser light emitted from the amplification optical fiber by the seed laser light and the pumping light in the emitted state, the wavelength converter being provided between the amplification optical fiber and the output unit; and an optical filter that passes the light to be subjected to wavelength conversion at the wavelength converter and suppresses transmission of the light not to be subjected to wavelength conversion at the wavelength converter when light in the same wavelength band as the seed laser light is incident on the wavelength converter, the optical filter being provided between the wavelength converter and the output unit.

The wavelength converter is formed with an optical fiber that causes stimulated Raman scattering, for example. In a case where the crest value of the intensity of incident light is large, this wavelength converter converts the incident light into a longer-wavelength light, and then emits the longer-wavelength light. In a case where the crest value of the intensity of incident light is small, this wavelength converter does not convert the wavelength of the incident light, and emits the incident light as it is. In this fiber laser device, when laser light that is amplified by the amplification optical fiber is emitted in the emitted state, the wavelength of the laser light is converted by the wavelength converter since the crest value of the laser light is large. As a result, the laser light having its wavelength converted passes through the optical filter, and is emitted from the output unit. In the pre-pumped state, on the other hand, the rare-earth element in the amplification optical fiber is pumped by the pumping light, but the seed laser light is not incident on the amplification optical fiber. As a result, only the ASE (Amplified Spontaneous Emission) generated by amplifying spontaneous emission light emitted from the pumped rare-earth element is emitted from the amplification optical fiber. Spontaneous emission light has a great spectrum width, and has a low crest value intensity. Therefore, when the ASE is input from the amplification optical fiber, the wavelength converter does not convert the wavelength of the incident light. Accordingly, even in a case where the ASE is emitted from the amplification optical fiber, transmission of the light that is emitted from the wavelength converter and is incident on the optical filter is suppressed by the optical filter. In this manner, emits of unnecessary light can be suppressed in the pre-pumped state.

Another fiber laser device of the invention includes: a seed laser light source that emits seed laser light; a pumping light source that emits pumping light; an amplification optical fiber that receives the seed laser light and the pumping light, amplifies the seed laser light, and emits laser light, the amplification optical fiber being doped with a rare-earth element to be pumped by the pumping light; an output unit that emits the laser light that is emitted from the amplification optical fiber; a control unit that controls at least the seed laser light source and the pumping light source; and an instruction unit that inputs an output instruction and an output suspension instruction to the control unit, the output instruction being for causing the output unit to emit the laser light, the output suspension instruction being for causing the output unit to stop emitting the laser light. The seed laser light source and the pumping light source are put into an output state after a fixed period of time elapses from the time when the output instruction is input to the control unit, and the output state is ended after the fixed period of time elapses from the time when the output suspension instruction is input to the control unit, the fixed period of time being set beforehand. When the period from the time when the output suspension instruction is input to the control unit to the time when the next output instruction is input to the control unit is shorter than the fixed period of time, the seed laser light source and the pumping light source are in a pre-pumped state during the period from the end of the output state to the next output state. When the period from the time when the output suspension instruction is input to the control unit to the time when the next output instruction is input to the control unit is longer than the fixed period of time, the seed laser light source and the pumping light source are in a suspended state during the period from the end of the output state to the time when the next output instruction is input to the control unit, and are in the pre-pumped state during the period from the time when the output instruction is input to the control unit to the next output state. In the pre-pumped state, seed laser light having a small crest value is incident on the amplification optical fiber, and the pumping light with a predetermined intensity is incident on the amplification optical fiber. In the output state, the seed laser light is incident on the amplification optical fiber to cause the output unit to emit the laser light, and the pumping light is incident on the amplification optical fiber. The fixed period of time, in the pre-pumped state, is shorter than the period from the time when the seed laser light having the small crest value and the pumping light with the predetermined intensity are incident on the amplification optical fiber to a time when the gain of a resonator of the fiber laser device becomes positive.

In such a fiber laser device, seed laser light having a small crest value is incident on the amplification optical fiber in the pre-pumped state. Accordingly, pumping of the rare-earth element by the pumping light and relaxing of the rare-earth element by the seed laser light can be balanced. In accordance with the required specification of the fiber laser device, the intensity of the seed laser light, the intensity of the pumping light in the pre-pumped state, and the fixed period of time can be optimized within such ranges that the gain of the resonator of the fiber laser device does not become positive in the pre-pumped state.

Further, in the above fiber laser device, the seed laser light emitted from the seed laser light source in the output state may be pulsed light, and the seed laser light emitted from the seed laser light source in the pre-pumped state may be continuous light.

The above fiber laser device preferably further includes: a wavelength converter that performs no wavelength conversion on the light that is emitted from the amplification optical fiber by the seed laser light having the small crest value and the pumping light in the pre-pumped state, and performs wavelength conversion on the laser light that is emitted from the amplification optical fiber by the seed laser light and the pumping light in the output state, the wavelength converter being provided between the amplification optical fiber and the output unit; and an optical filter that passes the light to be subjected to wavelength conversion at the wavelength converter and suppresses transmission of the light not to be subjected to wavelength conversion at the wavelength converter when light in the same wavelength band as the seed laser light is incident on the wavelength converter, the optical filter being provided between the wavelength converter and the output unit.

In such a fiber laser device, the seed laser light having the small crest value that is incident on the amplification optical fiber in the pre-pumped state is amplified by stimulated emission from the rare-earth element and is emitted from the amplification optical fiber. However, the wavelength converter is designed not to perform wavelength conversion on the light that is emitted from the amplification optical fiber and is incident on the wavelength converter at this point. Accordingly, emits of laser light from the output unit can be suppressed in the pre-pumped state.

Also, in the above described fiber laser device, the intensity of the pumping light in the pre-pumped state is preferably equal to or lower than the intensity of the pumping light in the output state.

Effect of Invention

The invention provides a fiber laser device that can suppress emits of unnecessary light having high crest values during the periods other than the periods during which laser light is emitted, while shortening the rise time of the laser light to be emitted.

DESCRIPTION OF EMBODIMENTS

Preferred embodiments of fiber laser devices according to the invention will be described in detail below with reference to the accompanying drawings.

First Embodiment

Figure 1:
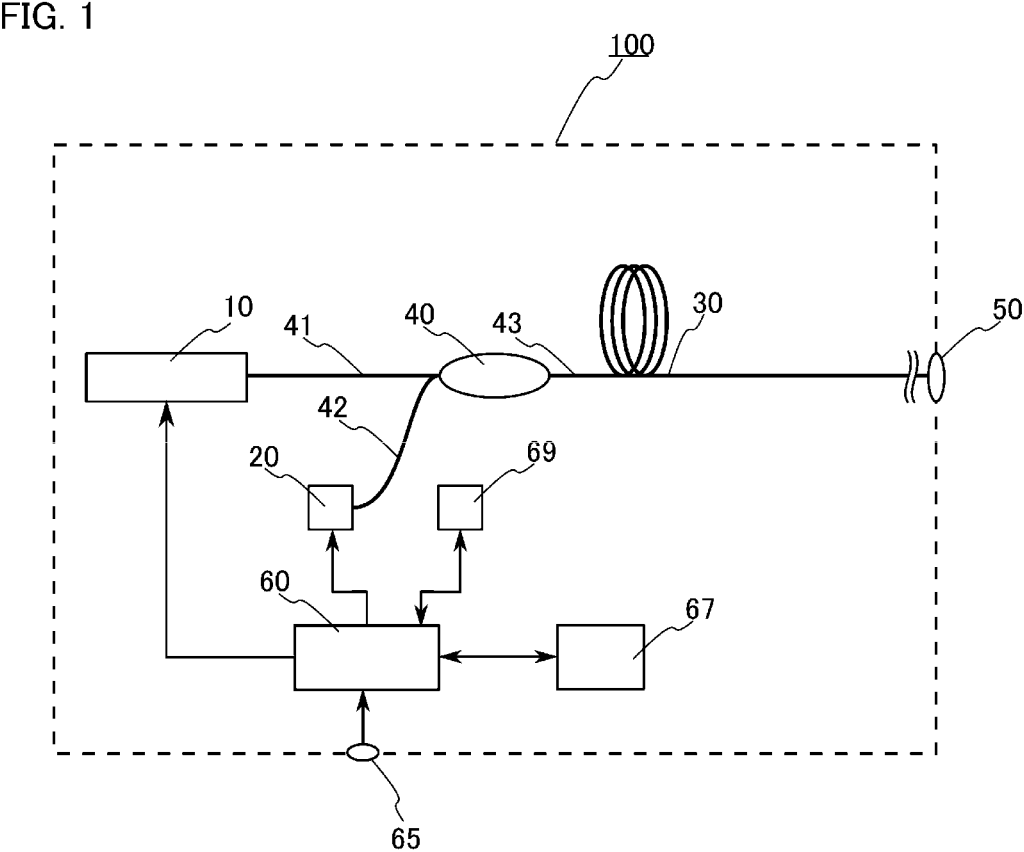
FIG. 1 is a diagram showing a fiber laser device according to a first embodiment of the invention.

FIG. 1 is a diagram showing a fiber laser device according to a first embodiment of the invention.

As shown in FIG. 1, a fiber laser device 100 includes as main components: a seed laser light source 10 that emits seed laser light at a wavelength $\lambda 1$; a pumping light source 20 that emits pumping light; an amplification optical fiber 30 on which the pumping light and the seed laser light are incident; an optical coupler 40 that the pumping light and the seed laser light are incident on the amplification optical fiber 30; an output unit 50 that emits the light emitted from the amplification optical fiber 30; a control unit 60 that controls the seed laser light source 10 and the pumping light source 20; an instruction unit 65 that inputs an instruction for emitting and stopping the laser light from the output unit 50, to the control unit 60; and a memory 67 that stores the intensity of the pumping light emitted from the pumping light source 20 and the like.

Figure 2:
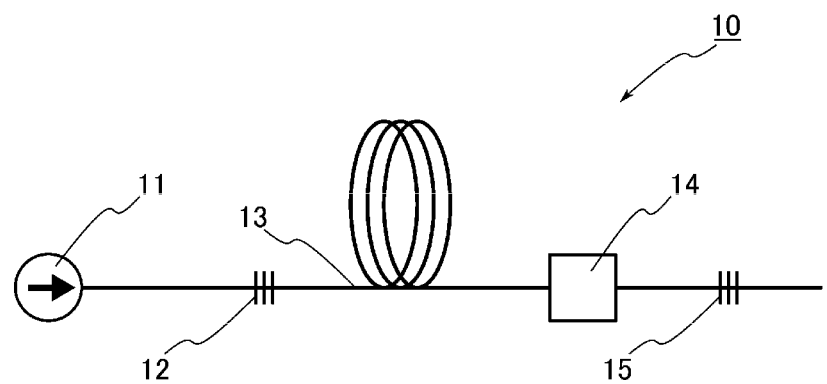
FIG. 2 is a diagram showing the seed laser light source of FIG. 1.

FIG. 2 is a diagram showing the seed laser light source 10 of FIG. 1. In this embodiment, a laser output device of a Fabry-Perot type is used as the seed laser light source 10. As shown in FIG. 2, the seed laser light source 10 includes: a laser oscillator 11 that emits pumping light; a rare-earth doped fiber 13 on which the pumping light from the laser oscillator 11 is incident; a first FBG (Fiber Bragg Grating) 12 provided between the rare-earth doped fiber 13 and the laser oscillator 11; a second FBG 15 provided on the opposite side of the rare-earth doped fiber 13 from the laser oscillator 11; and an AOM (Acoustic Optical Modulator) 14 provided between the second FBG 15 and the rare-earth doped fiber 13.

The laser oscillator 11 is, for example, a semiconductor laser, and emits pumping light.

The output pumping light has a wavelength of 975 nm, for example. The pumping light emitted from the laser oscillator 11 is incident on the rare-earth doped fiber 13 via the first FBG 12. The pumping light is absorbed by the rare-earth element doped in the rare-earth doped fiber 13. As a result, the rare-earth element enters a pumped state. The rare-earth element in the pumped state emits spontaneous emission light in a wavelength band including the wavelength $\lambda 1$.

The wavelength $\lambda 1$ of the spontaneous emission light at this point becomes a wavelength of 1064 nm when the above mentioned pumping light at the wavelength of 975 nm is incident on a rare-earth fiber, for example. The spontaneous emission light propagates through the rare-earth doped fiber 13, and is incident on the AOM 14. This AOM 14 is controlled to repeatedly switch between a low-loss state and a high-loss state in a cyclic manner, or is controlled to maintain a low-loss state.

The AOM 14 suppresses transmission of light at a certain wavelength in a high-loss state, and passes light at the certain wavelength in a low-loss state. Therefore, when the AOM 14 is in a low-loss state, spontaneous emission light is incident on the second FBG 15 via the AOM 14. The second FBG 15 selectively reflects light in a wavelength band including the wavelength $\lambda 1$, at a reflectivity of approximately 50% or lower, for example. Therefore, the reflected spontaneous emission light is entered back to the rare-earth doped fiber 13 via the AOM 14, and is amplified by stimulated emission from the rare-earth element in the rare-earth doped fiber 13. The amplified light then reaches the first FBG 12. The first FBG 12 selectively reflects light in a wavelength band including the wavelength λ1, at a reflectivity of 99.5%, for example. Therefore, the light reflected by the first FBG 12 is entered back to the rare-earth doped fiber 13, and is then further amplified. The amplified light is then incident on the second FBG 15 via the AOM 14, and part of the light passes through the second FBG 15. In the above manner, the first FBG 12 and the second FBG 15 form a Fabry-Perot oscillator. In synchronization with the operation of the AOM 14 repeatedly switching between a low-loss state and a high-loss state, pulsed light is amplified, and the amplified pulsed light is emitted as seed laser light from the second FBG 15. The wavelength λ1 of the seed laser light emitted from the seed laser light source 10 is the wavelength of 1064 nm, for example, and the pulse recurrence frequency is 100 kHz, for example.

In a case where the AOM 14 is controlled to maintain a low-loss state, seed laser light that is continuous light at the same wavelength is emitted from the seed laser light source 10.

At the seed laser light source 10, the output of seed laser light as pulsed light or continuous light is controlled, or the intensity of the light is controlled, as the AOM 14 is controlled by a control signal from the control unit 60.

The seed laser light emitted from the seed laser light source 10 is incident on the optical coupler 40.

Meanwhile, the pumping light source 20 is formed with laser diodes that output pumping light, and the intensity of the output pumping light is adjusted by a control signal from the control unit 60. The pumping light source 20 emits pumping light that puts the rare-earth element in the amplification optical fiber 30 into a pumped state, and the pumping light emitted from the pumping light source 20 is incident on the optical coupler 40. The wavelength of the pumping light emitted from the pumping light source 20 is 975 nm, for example.

The optical coupler 40 includes: an input port 41 on which the seed laser light from the seed laser light source 10 is incident; a pumping light input port 42 on which the pumping light from the pumping light source 20 is incident; and an output port 43 that emits the incident seed laser light and the incident pumping light. The input port 41 is formed with a single-mode fiber that allows the seed laser light from the seed laser light source 10 to propagate as single-mode light. The pumping light input port 42 is formed with a multi-mode fiber that allows the pumping light emitted from the pumping light source 20 to propagate as multi-mode light. The output port 43 is formed with a double-clad fiber including a core, a clad coating the core, and a plastic clad coating the clad. The output port 43 is designed to allow the seed laser light to propagate as single-mode light through the core, and the pumping light to propagate as multi-mode light through the core and the clad. The seed laser light and the pumping light emitted from the output port 43 are incident on the amplification optical fiber 30.

The amplification optical fiber 30 is formed with a double-clad fiber that includes: a core doped with a rare-earth element; a clad coating the core; and a plastic clad coating the clad. The core allows the seed laser light emitted from the optical coupler 40 to propagate as single-mode light, and the core and the clad allow the pumping light emitted from the optical coupler 40 to propagate as multi-mode light. When passing through the core, part of the pumping light is absorbed by the rare-earth element, and the rare-earth element is pumped to a higher level. The rare-earth element that has been pumped to a higher level and been put into an inverted distribution state causes stimulated emission with the seed laser light propagating through the core. The seed laser light is amplified by the stimulated emission, and the amplified laser light is emitted from the amplification optical fiber 30. In such an amplification optical fiber, the diameter of the core portion is 10 μm, the outside diameter of the clad portion is 125 μm, the core is formed with quartz doped with ytterbium as a rare-earth element, and the clad is formed with quartz not doped with any dopant, for example. When the output of laser light from the amplification optical fiber 30 is stopped, the level of the pumped state of the rare-earth element is not immediately lowered even if the incident of pumping light to the amplification optical fiber 30 is stopped, but is gradually lowered over a certain period of time.

The output unit 50 emits the laser light amplified by the amplification optical fiber 30 to the outside of the fiber laser device 100. In a case where pulsed seed laser light is emitted from the seed laser light source 10 as described above, the output unit 50 emits pulsed laser light that is synchronized with the seed laser light emitted from the seed laser light source 10.

The instruction unit 65 inputs an output instruction for causing the output unit 50 to emit laser light and an output suspension instruction for suspending the output of laser light from the output unit 50, to the control unit 60.

Based on the output instruction and the output suspension instruction from the instruction unit 65, the control unit 60 controls the seed laser light source 10 and the pumping light source 20. Specifically, by controlling the laser oscillator 11 and the AOM 14 in the seed laser light source 10, the control unit 60 controls whether the seed laser light source 10 emits seed laser light, controls the intensity of the seed laser light, and controls the seed laser light to turn into pulsed light or continuous light. Further, by controlling the pumping light source 20, the control unit 60 controls whether the pumping light source 20 emits pumping light, and controls the intensity of the pumping light emitted from the pumping light source 20.

The memory 67 stores beforehand the intensity of the pumping light for causing the output unit 50 to emit laser light in an output state, the intensity of pumping light in a pre-pumped state or prior to laser light is emitted from the output unit 50 (hereinafter referred to as the pre-pumping light), a fixed period of time during which the pre-pumping light is emitted, and the like. In a case where pre-pumping light with a predetermined intensity is incident on the amplification optical fiber 30, the fixed period of time is shorter than the period from the time when this pre-pumping light is incident on the amplification optical fiber 30 to the time when the gain of the resonator of the fiber laser device becomes positive. The intensity of the pre-pumping light and the fixed period of time are set beforehand by advance measurement, and are stored into the memory 67.

Here, the gain of the resonator of the fiber laser device 100 becoming positive means that the gain in the laser resonator, which can have parasitic oscillation with the amplification optical fiber 30 serving as the gain medium, is larger than the loss. In the fiber laser device 100, a preliminary experiment can be conducted to determine the intensity and the duration of the incident of pre-pumping light to the amplification optical fiber 30 required for causing unintended (parasitic) oscillation. Parasitic oscillation occurrence means that the gain is positive in the oscillator causing the oscillation. Here, the resonator includes at least part of the amplification optical fiber 30, is formed with light reflective elements at both ends of the part of the amplification optical fiber 30, and can cause parasitic oscillation. The light reflective elements are derived from refractive index differences existing at the connecting portion (the fusion splicing portion) between the seed laser light source 10 and the input port 41, the connecting portion (the fusion splicing portion) between the amplification optical fiber 30 and the output port 43, the connecting portion between the amplification optical fiber 30 and the output unit 50, and the like, or Rayleigh scattering and the like in the amplification optical fiber 30.

In a case where the intensity of the pre-pumping light is 4 W in the above described amplification optical fiber 30, the period required for the gain of this resonator to become positive, or the period from the time when the pre-pumping light is incident on the amplification optical fiber 30 to the time when the gain of the resonator of the fiber laser device 100 becomes positive and oscillates, is 400 µs. Therefore, in the fiber laser device 100 according to this embodiment, the fixed period of time T is 200 µs, which is shorter than 400 µs required for the gain of the above described resonator to become positive, for example.

The period required for the gain of the resonator to become positive varies depending on the intensity of the pre-pumping light. Accordingly, it is preferable to set the fixed period of time in accordance with the intensity of the pre-pumping light. The fixed period of time is set in accordance with the intensity of the pre-pumping light so that the pumped state of the rare-earth element after the passage of the fixed period of time is stabilized at a predetermined level. In this manner, the rise time of laser light that is emitted from the fiber laser device 100 can be restrained from varying.

With the above described amplification optical fiber 30, in a case where the intensity of the pre-pumping light is 2 W, the gain can be prevented from exceeding the loss, and the pumped state of the rare-earth element can be stabilized at a predetermined level, even in a steady state after the passage of a sufficient period of time. In this case, the fixed period of time can be set at 5 ms, for example, which is longer than the relaxation time of the rare-earth element in the amplification optical fiber 30. As the fixed period of time is set at a longer period than the relaxation time of the rare-earth element in the amplification optical fiber 30, the gain can be maintained at a constant level, and unnecessary light emits with high crest values can be suppressed during the periods other than the laser light output periods while the rise time of laser light to be emitted is shortened.

A counter 69 emits information for calculating the period of time from when an output instruction from the instruction unit 65 is input to the control unit 60, the period of time from when an output instruction from the instruction unit 65 ceases to be input to the control unit 60, and the like.

Figure 3:
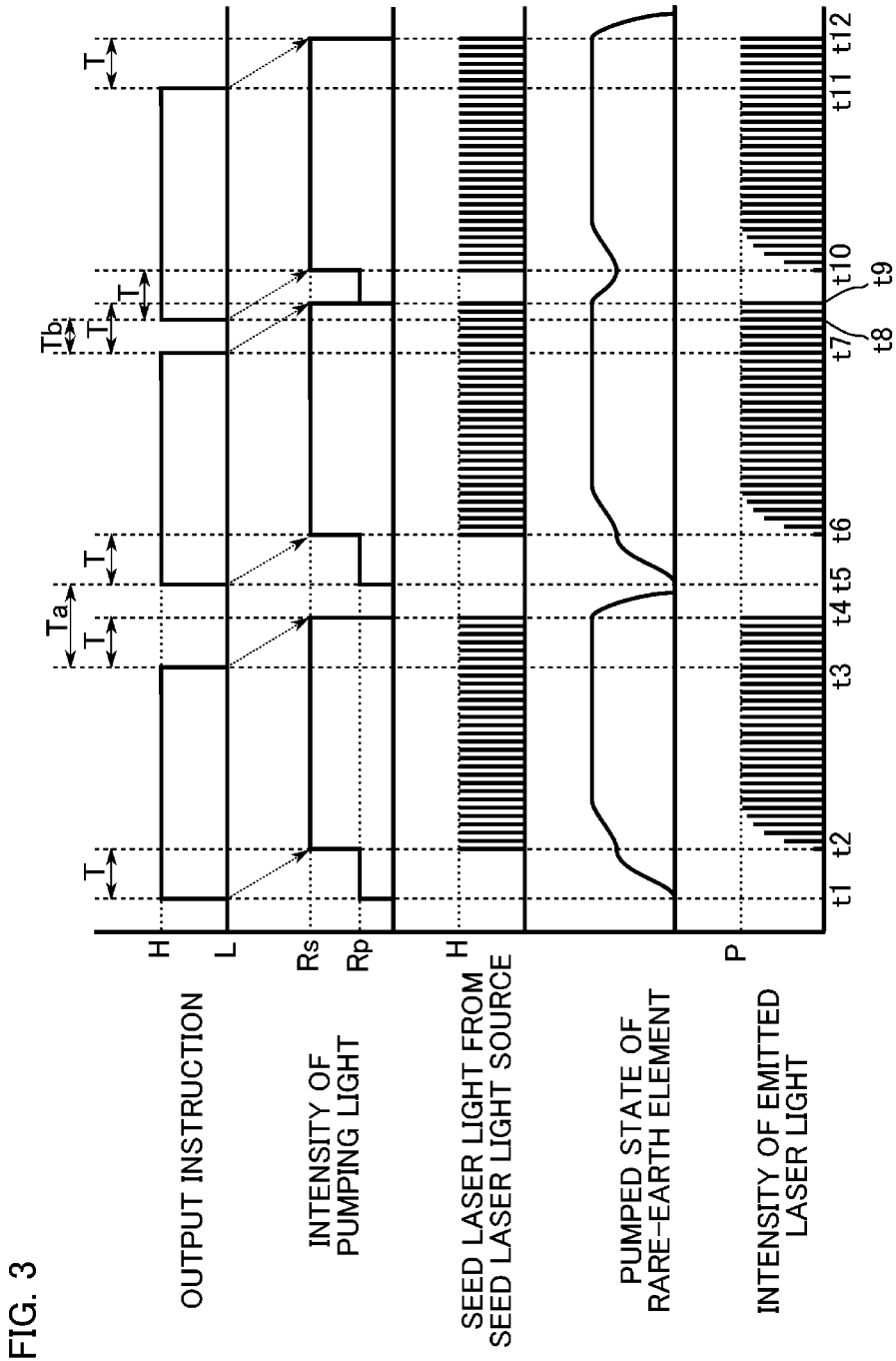
FIG. 3 is a timing chart schematically showing operations of the fiber laser device of FIG. 1.

Referring now to FIG. 3, operations of the fiber laser device 100 are described.

FIG. 3 is a timing chart schematically showing operations of the fiber laser device 100.

FIG. 3 schematically shows an output instruction input from the instruction unit 65 to the control unit 60, the intensity of pumping light emitted from the pumping light source 20, the intensity of seed laser light emitted from the seed laser light source 10, the pumped state of the rare-earth element in the amplification optical fiber 30, and the intensity of laser light emitted from the output unit 50. In FIG. 3, where the output instruction is at H, the instruction unit 65 is issuing the output instruction to the control unit 60. Where the intensity of the pumping light is higher, the pumping light source 20 is emitting pumping light with a higher intensity. Where the intensity of the seed laser light from the seed laser light source is higher, the seed laser light source 10 is emitting seed laser light with a higher intensity. Where the level of the pumped state of the rare-earth element is higher, the rare-earth element in the amplification optical fiber 30 is in a pumped state at a higher level. Where the intensity of the output laser light is higher, the output unit 50 is emitting laser light with a higher intensity.

First, a power supply (not shown) for the fiber laser device 100 is switched on, to supply power to the control unit 60. Supplied with power, the control unit 60 awaits an input of an output instruction from the instruction unit 65.

At time t1, an output instruction is input from the instruction unit 65. This output instruction at time t1 is the first output instruction issued after the power supply to the fiber laser device 100 is switched on. In this case, the control unit 60 reads the intensity Rp of pre-pumping light from the memory 67, and controls the seed laser light source 10 and the pumping light source 20 to enter a pre-pumped state for the fixed period of time T that is set beforehand in accordance with a signal from the counter 69. After put into the pre-pumped state, the pumping light source 20 is controlled to emit the pre-pumping light with the intensity Rp, and the seed laser light source 10 is controlled not to emit the seed laser light. It should be noted that the controlling the seed laser light source 10 includes issuing no instructions to the seed laser light source 10.

In this manner, the level of the pumped state of the rare-earth element in the amplification optical fiber 30 is gradually made higher. However, the fixed period of time T is a shorter period than the period from the time when the pre-pumping light with the intensity Rp is incident on the amplification optical fiber 30 to the time when the gain of the resonator of the fiber laser device 100 becomes positive, as described above. Accordingly, in the pre-pumped state, the fiber laser device 100 is restrained from causing unintended oscillation.

At time t2 when the fixed period of time T that is set beforehand elapses from time t1, the control unit 60 controls the seed laser light source 10 and the pumping light source 20 to enter an output state. At this point, the control unit 60 reads the intensity Rs of pumping light in the output state from the memory 67, and controls the pumping light source 20, so that the pumping light source 20 emits the pumping light with the predetermined intensity Rs. The control unit 60 further controls the seed laser light source 10, so that the seed laser light source 10 emits pulsed seed laser light having an intensity H as the crest value and the wavelength λ1. The intensity Rs of the pumping light and the intensity H as the crest value of the seed laser light at this point are such intensities that laser light is emitted from the output unit 50. Specifically, the intensity Rs of the pumping light in the output state is 6 W, for example, and the intensity H as the crest value of the seed laser light is 4 W, for example.

In the output state, the pumping light with the intensity Rs is emitted from the pumping light source 20, and the pulsed seed laser light is emitted from the seed laser light source 10. The rare-earth element in the amplification optical fiber 30 is then pumped to an even higher level, and causes stimulated emission, to amplify the intensity of the seed laser light. As a result, amplified pulsed laser light is emitted from the amplification optical fiber 30, and the amplified pulsed laser light is emitted from the output unit 50.

At a point immediately after time t2, however, the intensity of the laser light emitted from the output unit 50 has not yet reached a predetermined intensity P. When a predetermined period of time elapses from time t2, the rare-earth element is pumped to an even higher level, and laser light with the predetermined intensity P is emitted from the output unit 50. The laser light output is then stabilized. This predetermined period of time is the rise time of the laser light that is emitted from the output unit 50. For example, in the case of the first laser light output after the power supply is switched on, the rise time of the laser light is 50 µs or shorter, where the intensity Rp of the pre-pumping light is 2 W as described above, the fixed period of time T is 100 µs, the intensity Rs of the pumping light in the output state is 6 W, and the intensity H as the crest value of the seed laser light is 4 W.

At time t3 when the input of the output instruction from the instruction unit 65 is stopped, the control unit 60 calculates the fixed period of time T from time t3, and ends the output state of the seed laser light source 10 and the pumping light source 20 at time t4 when the fixed period of time T elapses from time t3, in accordance with information from the counter 69. At this point, the output of the seed laser light from the seed laser light source 10 and the output of the pumping light from the pumping light source 20 are stopped. As a result, the output of the laser light from the output unit 50 is stopped. The control unit 60 again awaits an output instruction from the instruction unit 65.

In this embodiment, the instruction unit 65 continues to input an output instruction to the control unit 60 during the period in which laser light is to be emitted as described above, and stops the input of the output instruction to the control unit 60 when the output of laser light is to be stopped. Therefore, in this embodiment, the instruction unit 65 stopping an input of an output instruction to the control unit 60 is equivalent to the instruction unit 65 inputting an output suspension instruction to the control unit 60.

As shown in FIG. 3, the level of the pumped state of the rare-earth element in the amplification optical fiber 30 becomes gradually lower after time t4 when the output state comes to an end, and the rare-earth element enters the ground state when a predetermined period of time elapses from time t4.

At time t5 when a period of time Ta that is longer than the fixed period of time T elapses from time t3, an output instruction is input from the instruction unit 65 to the control unit 60. That is, at time t5, which is later than time t4 when the fixed period of time T elapses from time t3, an output instruction is input to the control unit 60. At time t5, the output state of the seed laser light source 10 and the pumping light source 20 have already ended. In this case, the control unit 60 reads the intensity Rp of the pre-pumping light from the memory 67, and controls the seed laser light source 10 and the pumping light source 20 to enter a pre-pumped state for the fixed period of time T from time t5 that is set beforehand in accordance with a signal from the counter 69. The pumping light source 20 is then controlled to emit the pre-pumping light with the intensity Rp, and the seed laser light source 10 is controlled not to emit the seed laser light. The pumped state of the rare-earth element in the amplification optical fiber 30 is made gradually higher as in the case of the pre-pumping between time t1 and time t2. However, the fixed period of time T between t5 and t6 is a shorter period of time than the period from the time when the pre-pumping light with the intensity Rp is incident on the amplification optical fiber 30 to the time when the gain of the resonator of the fiber laser device 100 becomes positive. Accordingly, in this pre-pumped state, the fiber laser device 100 is restrained from causing unintended oscillation.

At time t6 when the fixed period of time T elapses from time t5, the control unit 60 controls the seed laser light source 10 and the pumping light source 20 to enter an output state.

At this point, the control unit 60 reads the intensity Rs of pumping light in the output state from the memory 67, and controls the pumping light source 20, so that the pumping light source 20 emits the pumping light with the predetermined intensity Rs. The control unit 60 further controls the seed laser light source 10, so that the seed laser light source 10 emits pulsed seed laser light having an intensity H as the crest value and the wavelength λ1.

In the above manner, the rare-earth element in the amplification optical fiber 30 is pumped to an even higher level, and causes stimulated emission with seed laser light, to amplify the intensity of the seed laser light that is incident from the seed laser light source 10. Amplified pulsed laser light is then emitted from the output unit 50. When a predetermined period of time has elapsed from time t6, the rare-earth element is pumped to an even higher level, and laser light that is emitted from the output unit 50 rises like the laser light that is emitted after time t2 has elapsed.

At time t7 when the input of the output instruction from the instruction unit 65 to the control unit 60 is stopped, the control unit 60 calculates the fixed period of time T that is determined beforehand from time t7 in accordance with information from the counter 69, so as to end the output state of the seed laser light source 10 and the pumping light source 20 at time t9 when the fixed period of time T elapses from time t7.

At time t8, which is prior to time t9 when the fixed period of time T elapses from time t7, an output instruction is again input from the instruction unit 65 to the control unit 60. A period of time Tb is shorter than the fixed period of time T from time t7 when an output suspension instruction is input to the control unit 60. At time t8 when the period of time Tb elapses from time t7, an output instruction is input from the instruction unit 65 to the control unit 60. Since time t8 is prior to the time when the fixed period of time T elapses from time t7, the output state of the seed laser light source 10 and the pumping light source 20 have not ended. In this case, the control unit 60 determines that the period of time Tb is shorter than the fixed period of time T stored beforehand in the memory 67, and maintains the seed laser light source 10 and the pumping light source 20 in the output state. At time t9 when the fixed period of time T elapses from time t7 when the input of the output instruction from the instruction unit 65 to the control unit 60 is stopped, the control unit 60 ends the output state of the seed laser light source 10 and the pumping light source 20.

At time t9 when the output state of the seed laser light source 10 and the pumping light source 20 is ended, the control unit 60 reads the intensity Rp of pre-pumping light from the memory 67, and, in accordance with information from the counter 69, maintains the seed laser light source 10 and the pumping light source 20 in a pre-pumped state until time t10 when the fixed period of time T elapses from time t8 when the output instruction is input. After put into the pre-pumped state, the pumping light source 20 is controlled to emit the pre-pumping light with the intensity Rp, and the seed laser light source 10 is controlled not to emit the seed laser light. In this manner, the seed laser light source 10 and the pumping light source 20 are controlled to switch from the output state to the pre-pumped state, and are maintained in the pre-pumped state between time t9 and time t10. The period of time Tb between time t10 and time t11 is shorter than the fixed period of time T, and is also shorter than the period from the time when the pre-pumping light with the intensity Rp is incident to the amplification optical fiber 30 to the time when the gain of the resonator of the fiber laser device 100 becomes positive. Accordingly, in this pre-pumped state, the fiber laser device 100 is restrained from causing unintended oscillation.

When the seed laser light source 10 and the pumping light source 20 are put into the pre-pumped state, the intensity of the pumping light that is incident to the amplification optical fiber 30 becomes lower. Therefore, the level of the pumped state of the rare-earth element in the amplification optical fiber gradually becomes lower. At time t10, however, the pumped state of the rare-earth element is closer to a predetermined pumped state than in a case where the rare-earth element is not put into a pre-pumped state.

At time t10, the control unit 60 puts the seed laser light source 10 and the pumping light source 20 into an output state. As a result, pulsed laser light rises, and is emitted from the output unit 50.

At time t11 when the input of the output instruction from the instruction unit 65 to the control unit 60 is stopped, the control unit 60 ends the output state of the seed laser light source 10 and the pumping light source 20 at time t12 when the fixed period of time T elapses from time t11, in accordance with information from the counter 69.

As described above, in a case where the period from time t3 when an output suspension instruction is input to time t5 when the next output instruction is input is the period of time Ta that is longer than the fixed period of time T, the seed laser light source 10 and the pumping light source 20 are put into a pre-pumped state only for the fixed period of time T from the time when an output instruction is input to the time when the sources are put into the output state. That is, the seed laser light source 10 and the pumping light source 20 are in the pre-pumped state only for the fixed period of time T in which a time-shift occurs after an output instruction is input, but are not in the pre-pumped state during the period from time t4 when the output state prior to an input of an output instruction ends to time t5 when an output instruction is input. The fixed period of time T of this pre-pumped state is a shorter period than the period from the time when pre-pumping light with the intensity Rp is incident on the amplification optical fiber 30 to the time when the gain of the resonator of the fiber laser device 100 becomes positive. As the seed laser light source 10 and the pumping light source 20 are put into the pre-pumped state as described above, the pumped state of the rare-earth element is made closer to a predetermined high level at the time of the start of an output state, and the rise time of laser light can be shortened while being restrained from varying. That is, the pumped state (the inverted distribution state) of the rare-earth element at the time of the start of an output state can be controlled to be steady, regardless of the duration of the suspended state of the fiber laser device 100. Accordingly, the rise time of laser light can be shortened while being restrained from varying. Furthermore, the seed laser light source 10 and the pumping light source 20 are in a pre-pumped state for the fixed period of time T, which is a shorter period than the period from the time when the pre-pumping light having the intensity Rp is incident on the amplification optical fiber 30 to the time when the gain of the resonator of the fiber laser device 100 becomes positive. Accordingly, unintended oscillation of the fiber laser device 100 can be suppressed, and emits of unnecessary light with high crest values can also be suppressed. In a case where the period Tb from time t7 when an output suspension instruction is input to time t8 when the next output instruction is input is shorter than the fixed period of time T, on the other hand, the seed laser light source 10 and the pumping light source 20 are in a pre-pumped state between time t9 when the output state ends and time t10 when the next output state starts. In this manner, pre-pumping is performed even in a case where a sufficient pre-pumping period T cannot be secured. Accordingly, the rise time of laser light in an output state can be made shorter than that in a case where pre-pumping is not performed. With the fiber laser device 100 of this embodiment, emits of unnecessary light with high crest values can be suppressed during the periods other than the laser light output periods, while the rise time of laser light to be emitted is shortened.

Also, with this fiber laser device 100, the seed laser light source 10 and the pumping light source 20 are put into an output state after the fixed period of time T elapses from the time when an output instruction is input to the control unit 60, and the output state is ended when the fixed period of time T elapses from the time when an output suspension instruction is input to the control unit 60. That is, there is a time-shift of the fixed period of time T between the time when an output instruction is input to the control unit 60 and the time when the seed laser light source 10 and the pumping light source 20 are put into an output state, and between the time when an output suspension instruction is input to the control unit 60 and the time when the output state of the seed laser light source 10 and the pumping light source 20 comes to an end. Accordingly, the period from the time when an output instruction is input to the control unit 60 to the time when an output suspension instruction is input is the same as the period required for the seed laser light source 10 and the pumping light source 20 to be put into an output state. Accordingly, users can use the fiber laser device 100 without any feeling of discomfort.

Second Embodiment

Figure 4:
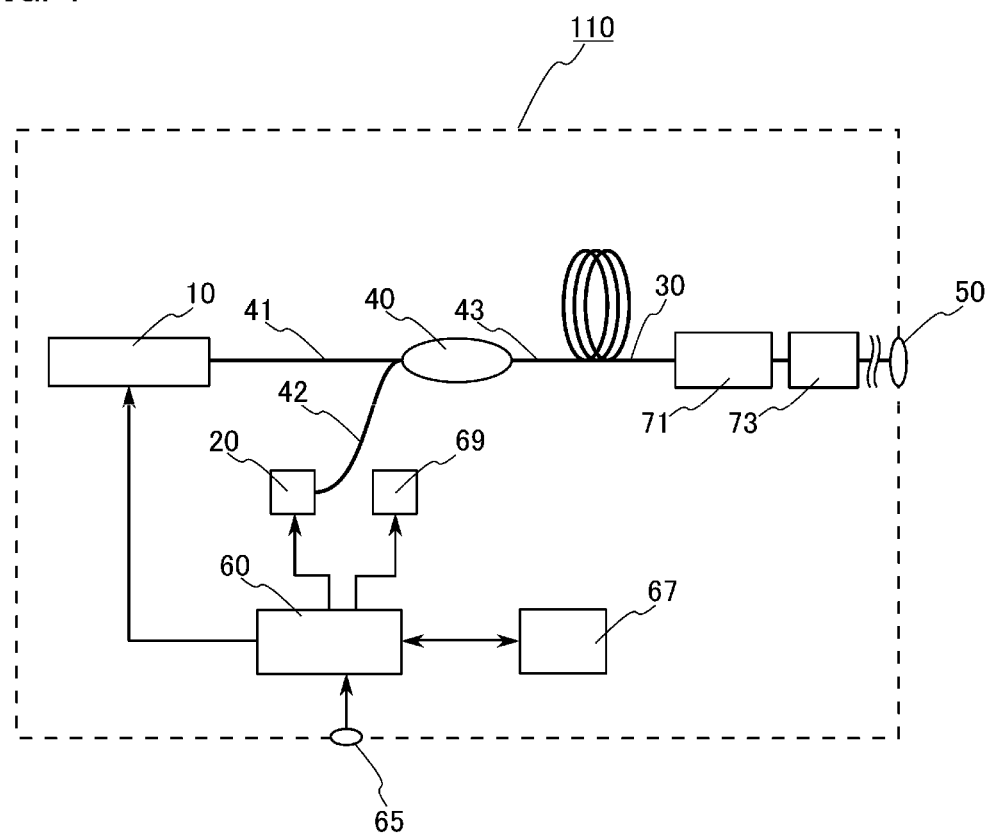
FIG. 4 is a diagram showing a fiber laser device according to a second embodiment of the invention.

Referring now to FIG. 4, a second embodiment of the invention is described in detail. It should be noted that components that are identical or similar to those in the first embodiment are denoted by the same reference numerals as those used in the first embodiment, and the same explanation will not be repeated. FIG. 4 is a diagram showing a fiber laser device according to the second embodiment of the invention.

As shown in FIG. 4, a fiber laser device 110 differs from the first embodiment in including: a wavelength converter 71 that is provided between the amplification optical fiber 30 and the output unit 50, and receives light that is emitted from the amplification optical fiber 30; and an optical filter 73 that is provided between the wavelength converter 71 and the output unit 50, and receives light that is emitted from the wavelength converter 71.

The wavelength converter 71 is formed with an optical fiber that causes stimulated Raman scattering. In a case where the crest value of incident light is large, this wavelength converter converts the incident light into a longer-wavelength light, and then emits the longer-wavelength light. In a case where the crest value of incident light is small, this wavelength converter does not convert the wavelength of the incident light, and emits the incident light as it is. In this embodiment, the wavelength converter 71 is formed with a wavelength conversion optical fiber. When light with a predetermined intensity or higher is incident thereon, the wavelength converter 71 converts the wavelength of the light. Specifically, when laser light with a wavelength $\lambda 1$ is incident on the wavelength converter 71 that is to perform wavelength conversion, the wavelength converter 71 converts the incident light into light with a wavelength $\lambda 2$ that is longer than the wavelength $\lambda 1$ through stimulated Raman scattering. Therefore, light with a longer wavelength than that of the incident light is emitted from the wavelength converter 71.

When pre-pumping light is incident on the pumping light source 20 to the amplification optical fiber 30 in a pre-pumped state, the amplification optical fiber 30 generates spontaneous emission light. This spontaneous emission light is amplified by the amplification optical fiber 30, and is emitted as ASE, which is then incident on the wavelength converter 71. However, the light that is emitted from the amplification optical fiber 30 at this point has a small crest value, and therefore, the wavelength of the light is not converted by the wavelength converter 71. In an output state, on the other hand, seed laser light is emitted from the seed laser light source 10, and pumping light is emitted from the pumping light source 20. The amplification optical fiber 30 amplifies the seed laser light, and emits laser light. The laser light is then incident on the wavelength converter 71. The laser light that is emitted from the amplification optical fiber 30 at this point has a large crest value, and therefore, the wavelength of the laser light is converted by the wavelength converter 71.

Examples of such wavelength conversion optical fibers include an optical fiber that is formed with a core and a clad, with the core being doped with a dopant that increases a nonlinear optical constant. Examples of such dopants include germanium and phosphorus. For example, the wavelength converter 71 is a single-mode fiber that has 7 to 8 mass percent of germanium doped in the core thereof. The diameter of the core is 5 µm, and the length of the single-mode fiber is 20 m. When the intensity as the crest value of pulsed light is 70 W or higher, and light with the wavelength $\lambda 1$ of 1064 nm enters, the wavelength converter 71 emits light with the wavelength $\lambda 2$ of 1120 nm. When light with an intensity of 70 W or lower enters, the wavelength converter 71 does not perform wavelength conversion. The threshold value of the crest value in wavelength conversion by the wavelength converter 71 can be changed with the diameter of the core, the density of the dopant to be added, the length, or the like. Therefore, the diameter of the core, the density of the dopant to be added, and the length of the wavelength converter 71 of this embodiment are set so that wavelength conversion is performed when the crest value of light with the wavelength of 1120 nm is larger than 70 W, and no wavelength conversion is performed when the crest value is smaller than that. On the other hand, in a case where the diameter of the core, the density of the dopant to be added, and the length of the wavelength converter 71 are determined in advance, the emits of the seed laser light source 10 and the pumping light source 20 are set to achieve such a crest value of incident light that no wavelength conversion is performed in a pre-pumped state, but wavelength conversion is performed in an output state.

In a case where laser light with a wavelength that is emitted from the seed laser light source 10 enters via the wavelength converter 71, the optical filter 73 passes entered laser light that has its wavelength converted by the wavelength converter 71, but suppresses transmission of entered laser light that does not have its wavelength converted by the wavelength converter 71. Accordingly, in a case where laser light with a high intensity is emitted from the amplification optical fiber 30, and the wavelength of the laser light is converted by the wavelength converter 71, the laser light that is incident on the optical filter 73 passes through the optical filter 73. On the other hand, in a case where laser light with a low intensity is emitted from the amplification optical fiber 30, and the wavelength of the laser light is not converted by the wavelength converter 71, transmission of the laser light that is incident on the optical filter 73 is suppressed by the optical filter 73.

The optical filter 73 is formed with a dielectric multilayer filter, a photonic bandgap fiber, or the like. For example, in a case where laser light with the wavelength $\lambda 1$ of 1064 nm is incident on the wavelength converter 71, and is wavelength-converted by the wavelength converter 71 into laser light with the wavelength $\lambda 2$ of 1120 nm to be incident on the optical filter 73 as described above, the laser light passes through the optical filter 73. On the other hand, in a case where laser light with the wavelength $\lambda 1$ of 1064 nm is incident on the wavelength converter 71, and the laser light of 1064 nm is incident on the optical filter 73 without being subjected to the wavelength conversion by the wavelength converter 71, transmission of the laser light is suppressed by the optical filter 73. The intensity of pre-pumping light and a fixed period of time T are set in the same manner as in the first embodiment.

Next, operations of the fiber laser device 110 are described.

In the fiber laser device 110, while the pumping light source 20 and the seed laser light source 10 are in a pre-pumped state (t1 to t2, t5 to t6, t9 to t10), pre-pumping light is emitted from the pumping light source 20, as in the fiber laser device 100 of the first embodiment.

At this point, the pre-pumping light that is incident on the amplification optical fiber 30 causes the amplification optical fiber 30 to generate spontaneous emission light. This spontaneous emission light is amplified by the amplification optical fiber 30, and is emitted as ASE, which is then incident on the wavelength converter 71. However, the light that is emitted from the amplification optical fiber 30 has a smaller crest value than the threshold crest value for wavelength conversion to be performed by the wavelength converter 71, and therefore, is not subjected to the above described wavelength conversion at the wavelength converter 71. Accordingly, transmission of the light that is entered the wavelength converter 71 to the optical filter 73 is suppressed by the optical filter. As a result, light is not emitted from the output unit 50 in the pre-pumped state.

In a case where the wavelength converter 71 is a 20-m long single-mode fiber, the core is made of quartz doped with 7 to 8 mass percent of germanium, and the diameter of the core is 5 µm as described above, the light that is amplified and output by the amplification optical fiber 30 and is incident on the wavelength converter 71 does not have its wavelength converted by the wavelength converter 71 when the intensity R1 of the pre-pumping light is 2 W, for example, since the crest value of the light is smaller than the threshold crest value for the wavelength conversion to be performed by the wavelength converter 71.

Next, in the periods (t2 to t4, t6 to t9, t10 to t12) during which the pumping light source 20 and the seed laser light source 10 are in an output state, pumping light with an intensity Rs is emitted from the pumping light source 20, and pulsed seed laser light that has an intensity H as its crest value and has the wavelength $\lambda 1$ is emitted from the seed laser light source 10. The laser light that is emitted from the amplification optical fiber 30 at this point has a larger crest value than the threshold crest value for the wavelength conversion to be performed by the wavelength converter 71, and therefore, the wavelength of the laser light is converted by the wavelength converter 71. Accordingly, the laser light that is incident from the wavelength converter 71 to the optical filter 73 passes through the optical filter, and is emitted from the output unit 50. As described above, in the fiber laser device 110 according to this embodiment, the pre-pumped state period is shorter than the period from the time when pumping light with a predetermined intensity is incident on the amplification optical fiber to the time when the gain of the resonator of the fiber laser device becomes positive, as in the first embodiment. Accordingly, the fiber laser device does not cause unintended oscillation. Thus, emits of unnecessary light with high crest values can be suppressed during the periods other than the periods during which laser light is emitted. For example, in a case where the wavelength converter 71 is a 20-m long single-mode fiber, the core is made of quartz doped with 7 to 8 mass percent of germanium, and the diameter of the core is 5 µm as described above, the crest value of the laser light is 185 W, and the wavelength of the laser light that is incident on the wavelength converter 71 is converted, if the intensity Rs of the pumping light in the output state is 6 W, and the intensity H as the crest value of the seed laser light is 4 W.

In the above described fiber laser device 110, when laser light that is amplified by the amplification optical fiber 30 is emitted in an output state, the wavelength of the laser light is converted by the wavelength converter 71. The laser light having its wavelength converted by the wavelength converter 71 is incident on the optical filter 73. The laser light then passes through the optical filter 73, and is emitted from the output unit 50. In a pre-pumped state, on the other hand, the rare-earth element in the amplification optical fiber 30 is pumped by pre-pumping light. Meanwhile, the amplification optical fiber 30 is designed so that seed laser light emitted from the seed laser light source 10 is amplified through stimulated emission from the rare-earth element that is pumped by pumping light. In the pre-pumped state, however, the seed laser light is not incident on the amplification optical fiber 30. Accordingly, only ASE generated by amplifying spontaneous emission light emitted from the pumped rare-earth element is emitted from the amplification optical fiber. Spontaneous emission light has a great spectrum width, and has a low crest value intensity. Therefore, when ASE is incident on the amplification optical fiber 30, the wavelength converter 71 does not convert the wavelength of the incident light. Accordingly, even in a case where ASE is emitted from the amplification optical fiber 30, transmission of the light that is emitted from the wavelength converter 71 and is incident on the optical filter 73 is suppressed by the optical filter 73. In this manner, in the pre-pumped state, emits of unnecessary light from the output unit 50 can be suppressed.

Also, in this embodiment, the wavelength converter 71 is formed with an optical fiber that causes stimulated Raman scattering. However, this wavelength converter 71 is not necessarily an optical fiber, as long as this wavelength converter has the function to convert the wavelength of incident light into a different wavelength and output the wavelength-converted light when the crest value of the intensity of the incident light is large, and the function not to convert the wavelength of incident light but to emit the light as it is when the crest value of the intensity of the incident light is small. For example, the wavelength converter 71 may be a nonlinear optical crystal such as lithium triborate ($LiB_3O_5$) that generates second harmonics. Such a nonlinear optical crystal emits second harmonics (light with a ½ wavelength) when light with an intensity equal to or higher than a predetermined crest value is entered. In a case where a nonlinear optical crystal that generates second harmonics is used as the wavelength converter 71, a filter that passes the wavelength of the second harmonics is used as the optical filter 73, with transmission of the wavelength of light entered the wavelength converter 71 being suppressed.

Third Embodiment

Figure 5:
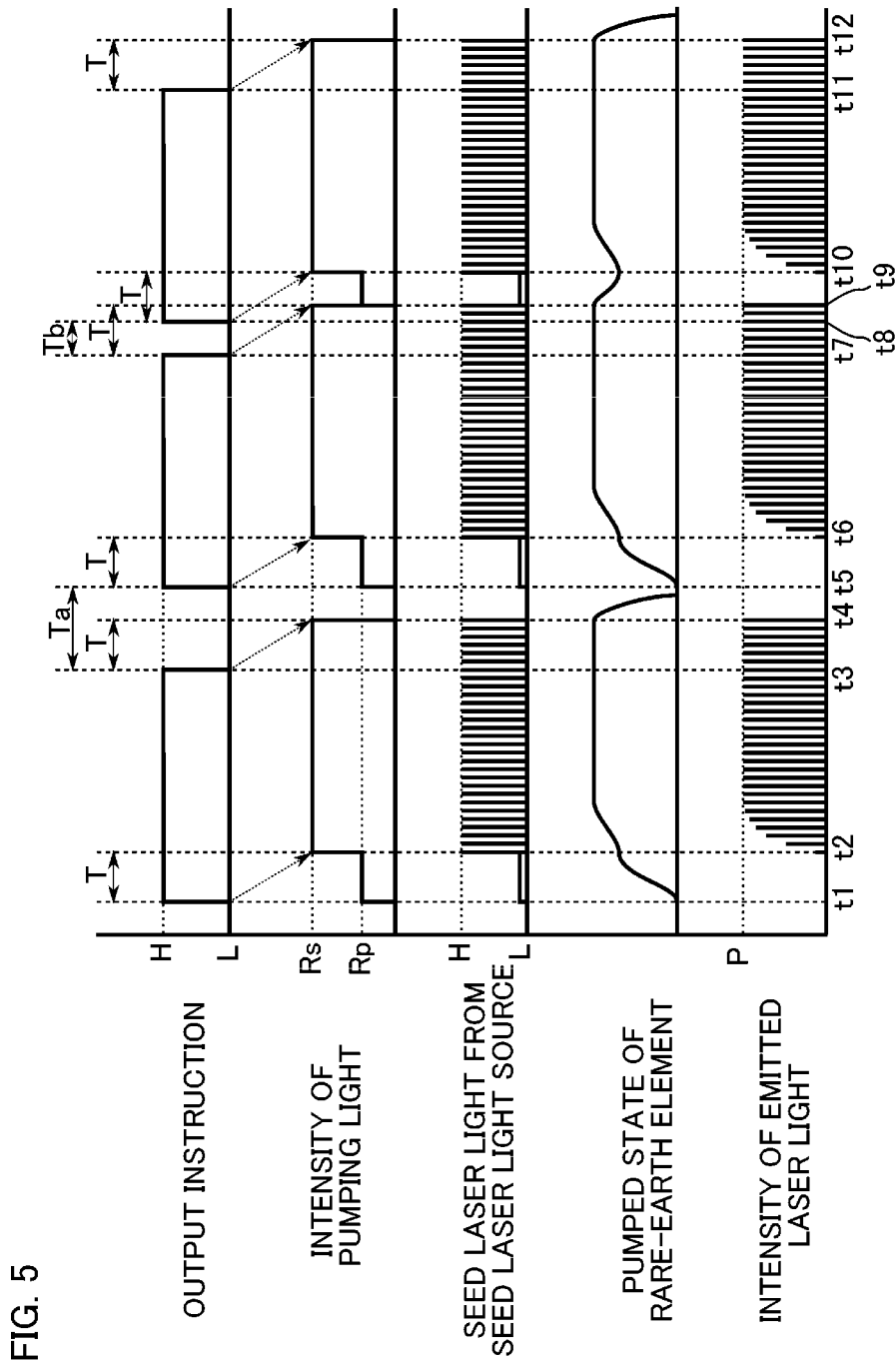
FIG. 5 is a timing chart schematically showing operations of a fiber laser device according to a third embodiment of the invention.

Referring now to FIG. 5, a third embodiment of the invention is described in detail. It should be noted that components that are identical or similar to those in the second embodiment are denoted by the same reference numerals as those used in the second embodiment, and the same explanation will not be repeated. This embodiment is a fiber laser device using the fiber laser device 110 described in the second embodiment.

FIG. 5 is a timing chart illustrating operations of the fiber laser device 110 according to the third embodiment of the invention. The fiber laser device 110 of this embodiment differs from the fiber laser device 110 of the second embodiment in that, in a pre-pumped state, pre-pumping light is emitted from the pumping light source 20, and seed laser light having a small crest value is emitted from the seed laser light source 10.

Specifically, as shown in FIG. 5, at time t1 (t5, t8), an output instruction is input from the instruction unit 65 to the control unit 60. The control unit 60 then controls the seed laser light source 10 and the pumping light source 20 to be in a pre-pumped state for the same period of time as that in the second embodiment. The control unit 60 then reads the intensity Rp of pre-pumping light from the memory 67, and causes the pumping light source 20 to emit the pre-pumping light with the intensity Rp in accordance with a signal from the counter 69, as in the second embodiment. In the pre-pumped state in this embodiment, the control unit 60 further controls the seed laser light source 10 to emit seed laser light that has an intensity L and a small crest value. In this embodiment, this seed laser light having the small crest value is continuous light.

The pumping light that is emitted from the pumping light source 20, and the seed laser light with the small crest value that is emitted from the seed laser light source 10 are incident on the amplification optical fiber 30. In the amplification optical fiber 30, the seed laser light having the small crest value is amplified by the emission stimulated by the seed laser light. The seed laser light is then emitted from the amplification optical fiber 30, and is incident on the wavelength converter 71. However, even when the light that is generated by amplifying the seed laser light at the amplification optical fiber 30 and is then emitted is incident on the wavelength converter 71, the wavelength converter 71 does not convert the wavelength of the incident light. For example, in a case where the wavelength converter 71 is a 20-m long single-mode fiber, the core is made of quartz doped with 7 to 8 mass percent of germanium, and the diameter of the core is 5 μm as described above, the intensity L of the seed laser light having a small crest value in the pre-pumped state is 1 W, and the wavelength of the seed laser light is not converted by the wavelength converter 71 if the intensity of the pre-pumping light is 2 W.

In the fiber laser device 110 according to this embodiment, the seed laser light is incident on the amplification optical fiber 30 in the pre-pumped state. Accordingly, pumping of the rare-earth element by the pumping light and relaxing of the rare-earth element by the seed laser light can be balanced. That is, in accordance with the required specification of the fiber laser device, the intensity of the seed laser light, the intensity of the pumping light in the pre-pumped state, and the fixed period of time can be optimized within such ranges that the gain of the resonator of the fiber laser device does not become positive in the pre-pumped state. Accordingly, the fiber laser device 100 can be restrained from causing unintended oscillation, and, in the pre-pumped state, emits of unnecessary light with high crest values can be more effectively suppressed.

Further, in the pre-pumped state, the seed laser light having a small crest value is amplified by the stimulated emission from the amplification optical fiber 30, and light with the wavelength λ1 is emitted. In the pre-pumped state, however, the wavelength of the light that is emitted from the amplification optical fiber 30 is not converted by the wavelength converter 71. Accordingly, transmission of the laser light that is entered the wavelength converter 71 to the optical filter 73 is suppressed by the optical filter 73. In this manner, emits of unnecessary light can be suppressed in the pre-pumped state.

Fourth Embodiment

Figure 6:
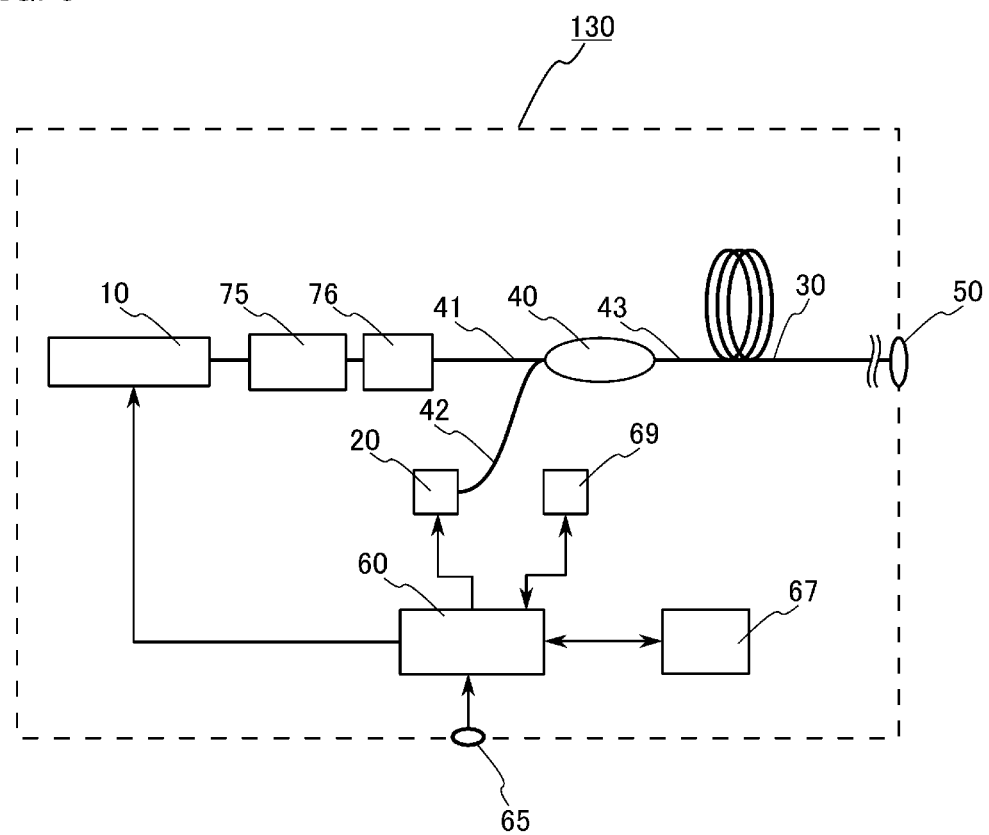
FIG. 6 is a diagram showing a fiber laser device according to a fourth embodiment of the invention.

Referring now to FIG. 6, a fourth embodiment of the invention is described in detail. It should be noted that components that are identical or similar to those in the first embodiment are denoted by the same reference numerals as those used in the first embodiment, and the same explanation will not be repeated. FIG. 6 is a diagram showing a fiber laser device according to the fourth embodiment of the invention.

As shown in FIG. 6, a fiber laser device 130 differs from the first embodiment in including: a wavelength converter 75 that is provided between the seed laser light source 10 and the optical coupler 40, and receives seed laser light that is emitted from the seed laser light 10; and an optical filter 76 that is provided between the wavelength converter 75 and the optical coupler 40, and receives light that is emitted from the wavelength converter 75.

The wavelength converter 75 has the same structure as the wavelength converter 71 of the second embodiment, and is the same as the wavelength converter 71 of the second embodiment in performing wavelength conversion when the crest value of incident light is larger than a predetermined value, but not performing wavelength conversion when the crest value is smaller than the predetermined value. The wavelength converter 75 differs from the wavelength converter 71 of the second embodiment in converting even the wavelength of light having a smaller crest value than that of light having its wavelength to be converted by the wavelength converter 71 of the second embodiment. Specifically, in a case where seed laser light with a low crest value is emitted from the seed laser light source 10 in a pre-pumped state, the wavelength converter 75 does not convert the wavelength of the seed laser light. When seed laser light with an intensity equal to or higher than a predetermined intensity is entered in an output state, the wavelength of the seed laser light entered the wavelength converter 75 is converted to a longer wavelength through stimulated Raman scattering or the like. Accordingly, when seed laser light having a higher crest value than a predetermined crest value is emitted from the seed laser light source 10, seed laser light at a longer wavelength than the seed laser light is emitted from the wavelength converter 75.

The optical filter 76 has the same structure as the optical filter 73 of the second embodiment. In a case where seed laser light that is emitted from the seed laser light source 10 is entered via the wavelength converter 75, the optical filter 76 passes entered laser light that has its wavelength converted by the wavelength converter 75, but suppresses transmission of entered laser light that does not have its wavelength converted by the wavelength converter 75. Accordingly, when seed laser light having a high crest value is emitted from the seed laser light source, the wavelength of the seed laser light is converted by the wavelength converter 75, and the optical filter 76 passes the seed laser light. In a case where seed laser light having a small crest value is emitted from the seed laser light 10, and the wavelength of the laser light is not converted by the wavelength converter 75, on the other hand, transmission of the seed laser light that is incident on the optical filter 76 is suppressed by the optical filter 76. The intensity of pre-pumping light and a fixed period of time T are set in the same manner as in the first embodiment.

Operations of the fiber laser device 130 in this embodiment are the same as those shown in FIG. 3, except that "seed laser light from the seed laser light source" is replaced with "seed laser light from the optical filter 76". That is, in a pre-pumped state in the fiber laser device 130 of this embodiment, seed laser light may not be emitted from the seed laser light source 10, or seed laser light having such a crest value that the wavelength of the seed laser light is not to be converted by the wavelength converter 75 may be emitted from the seed laser light source 10. In those cases, seed laser light is not emitted from the optical filter 76 as described above, and therefore, the level of the pumped state of the rare-earth element in the amplification optical fiber 30 is made gradually higher in the pre-pumped state as shown in FIG. 3. In an output state, seed laser light having a high crest value is emitted from the seed laser light source 10. Accordingly, the wavelength of the seed laser light is converted by the wavelength converter 75, and the seed laser light passes through the optical filter 76. In the above manner, seed laser light is incident on the amplification optical fiber 30, the seed laser light is amplified by the amplification optical fiber 30, and the amplified seed laser light is emitted as emitted light from the output unit 50. For example, the seed laser light that is emitted from the seed laser light source 10 in a pre-pumped state is continuous light, and the seed laser light in an output state is pulsed light. Since pulsed light normally has a higher crest value than continuous light, only the operation of the AOM 14 shown in FIG. 2 should be controlled in this case, and the operation control can be simplified accordingly.

Although the invention has been described with reference to the first through fourth embodiments as examples, the invention is not limited to them.

For example, in the first embodiment, the control unit 60 controls the seed laser light source 10 not to emit laser light in a pre-pumped state. However, the invention is not limited to that. For example, in a pre-pumped state, the control unit 60 may control the seed laser light source 10 to emit seed laser light having a small crest value. With this arrangement, the seed laser light is incident on the amplification optical fiber 30 in the pre-pumped state. Accordingly, pumping of the rare-earth element by the pumping light and relaxing of the rare-earth element by the seed laser light can be balanced. In accordance with the required specification of the fiber laser device, the intensity of the seed laser light, the intensity of the pumping light in the pre-pumped state, and the fixed period of time can be optimized within such ranges that the gain of the resonator of the fiber laser device does not become positive in the pre-pumped state. Accordingly, the fiber laser device 100 can be restrained from causing unintended oscillation, and, in the pre-pumped state, emits of unnecessary light with high crest values can be more effectively suppressed.

In this case, the pumping light and the seed laser light having the small crest value are incident on the amplification optical fiber 30 in the pre-pumped state. Accordingly, laser light that is generated by amplifying the seed laser light having the small crest value is emitted from the amplification optical fiber 30. However, the intensity of the seed laser light having the small crest value that is incident on the amplification optical fiber 30 is very low. Therefore, the laser light that is emitted from the amplification optical fiber 30 is also weak, and does not present any problem depending on uses of the fiber laser device 100.

Also, in the first through fourth embodiments, a laser output device of a Fabry-Perot type is used as the seed laser light source 10. However, a laser output device of a fiber ring type may also be used. Further, the seed laser light that is emitted from the seed laser light source 10 in an output state is pulsed light in the above embodiments. However, the seed laser light may be continuous light.

Also, in the first through fourth embodiments, the intensity of the pumping light that is emitted from the pumping light source 20 in a pre-pumped state is lower than the intensity of the pumping light that is emitted from the pumping light source 20 in an output state. However, the invention is not limited to that. The pumping light that is emitted from the pumping light source 20 in a pre-pumped state may have the same intensity as the intensity of the pumping light that is emitted from the pumping light source 20 in an output state.

In this case, the pumping light source 20 is put into the same state between the pre-pumped state and the output state. Accordingly, the load on the control unit can be reduced.

Further, the amplification optical fiber 30 allows laser light to propagate as single-mode light. However, the invention is not limited to that, and the amplification optical fiber 30 may be capable of allowing multi-mode light to propagate, for example.

Also, as long as the instruction unit 65 can input an output instruction to the control unit 60, the output instruction may be generated outside the fiber laser device, and be input to the control unit 60 via the instruction unit 65.

Further, in the above described embodiments, the instruction unit 65 continues to input an output instruction to the control unit 60 for the period of time during which laser light is to be emitted, and stops the incident of the output instruction from the instruction unit 65 to the control unit 60 at a time when the output of the laser light is to be stopped. The stopping the input of the output instruction from the instruction unit 65 to the control unit 60 is an input of an output suspension instruction from the instruction unit 65 to the control unit 60. However, the invention is not limited to that. For example, at a time when laser light is to be emitted, a pulse signal as an output instruction may be input from the instruction unit 65 to the control unit 60. Further, at a time when the output of the laser light is to be stopped, a pulse signal as an output suspension signal may be input from the instruction unit 65 to the control unit 60.

In the first through fourth embodiments, the intensity of pumping light in a pre-pumped state is a predetermined intensity. However, the pumped state of the rare-earth element in the amplification optical fiber 30 in a pre-pumped state may be monitored, and the intensity of the pumping light in the pre-pumped state may be controlled so as to achieve a predetermined pumped state. To monitor the pumped state of the rare-earth element in the amplification optical fiber 30, the ASE light intensity from the amplification optical fiber 30 may be received by a photodiode (PD) or the like. In this manner, the intensity of the pumping light can be controlled.

In the second embodiment, the wavelength change 75 and the optical filter 76 of the fourth embodiment may be used as in the fourth embodiment.

INDUSTRIAL APPLICABILITY

The invention provides a fiber laser device that can suppress emits of unnecessary light having high crest values during the periods other than the periods during which laser light is emitted, while shortening the rise time of the laser light to be emitted.

REFERENCE SIGNS LIST

10 . . . laser light source
11 . . . pumping light source
12 . . . first FBG
13 . . . rare-earth doped fiber
14 . . . AOM
15 . . . second FBG
20 . . . pumping light source
30 . . . amplification optical fiber
40 . . . optical coupler
50 . . . output unit
60 . . . control unit
65 . . . instruction unit
67 . . . memory
69 . . . counter
71, 75 . . . wavelength converter
73, 76 . . . optical filter
100, 110, 130 . . . fiber laser device

The invention claimed is:

1. A fiber laser device comprising:
a seed laser light source configured to emit seed laser light;
a pumping light source configured to emit pumping light;
an amplification optical fiber configured to receive the seed laser light and the pumping light, amplify the seed laser light, and output laser light, the amplification optical fiber being doped with a rare-earth element to be pumped by the pumping light;
an output unit configured to emit the laser light, the laser light being emitted from the amplification optical fiber;
a control unit configured to control at least the seed laser light source and the pumping light source; and
an instruction unit configured to input an output instruction and an output suspension instruction to the control unit, the output instruction being for causing the output unit to emit the laser light, the output suspension instruction being for causing the output unit to stop emitting the laser light, wherein
the seed laser light source and the pumping light source are put into an output state after a first fixed period of time elapses from a time when the output instruction is input to the control unit, and the output state of the seed laser light source and the pumping light source is kept for the first fixed period of time after the output suspension instruction is input to the control unit, and is ended after the first fixed period of time elapses from a time when the output suspension instruction is input to the control unit, the first fixed period of time being set beforehand,
when a period from the time when the output suspension instruction is input to the control unit to a time when the next output instruction is input to the control unit is shorter than the first fixed period of time, the seed laser light source and the pumping light source are in a pre-pumped state during a period from the end of the output state to the next output state,
when the period from the time when the output suspension instruction is input to the control unit to the time when the next output instruction is input to the control unit is longer than the first fixed period of time, the seed laser light source and the pumping light source are in a suspended state during a period from the end of the output state to the time when the next output instruction is input to the control unit, and are in the pre-pumped state during a period from the time when the output instruction is input to the control unit to the next output state,
in the pre-pumped state, the seed laser light is not incident on the amplification optical fiber, and the pumping light with a predetermined intensity is incident on the amplification optical fiber,
in the output state, the seed laser light is incident on the amplification optical fiber to cause the output unit to emit the laser light, and the pumping light is incident on the amplification optical fiber, and
the first fixed period of time, in the pre-pumped state, is shorter than a period from a time when the pumping light with the predetermined intensity is incident on the amplification optical fiber to a time when a gain of a resonator of the fiber laser device becomes positive.

2. A fiber laser device comprising:
a seed laser light source configured to emit seed laser light;
a pumping light source configured to emit pumping light;
an amplification optical fiber configured to receive the seed laser light and the pumping light, amplify the seed laser light, and emit laser light, the amplification optical fiber being doped with a rare-earth element to be pumped by the pumping light;

an output unit configured to emit the laser light, the laser light being from the amplification optical fiber;

a control unit configured to control at least the seed laser light source and the pumping light source; and an instruction unit configured to input an output instruction and an output suspension instruction to the control unit, the output instruction being for causing the output unit to emit the laser light, the output suspension instruction being for causing the output unit to stop emitting the laser light, wherein the seed laser light source and the pumping light source are put into an output state after a first fixed period of time elapses from a time when the output instruction is input to the control unit, and the output state of the seed laser light source and the pumping light source is kept for the first fixed period of time after the output suspension instruction is input to the control unit, and is ended after the first fixed period of time elapses from a time when the output suspension instruction is input to the control unit, the first fixed period of time being set beforehand, when a period from the time when the output suspension instruction is input to the control unit to a time when the next output instruction is input to the control unit is shorter than the first fixed period of time, the seed laser light source and the pumping light source are in a pre-pumped state during a period from the end of the output state to the next output state, when the period from the time when the output suspension instruction is input to the control unit to the time when the next output instruction is input to the control unit is longer than the first fixed period of time, the seed laser light source and the pumping light source are in a suspended state during a period from the end of the output state to the time when the next output instruction is input to the control unit, and are in the pre-pumped state during a period from the time when the output instruction is input to the control unit to the next output state, in the pre-pumped state, seed laser light having a small crest value is incident on the amplification optical fiber, and the pumping light with a predetermined intensity is incident on the amplification optical fiber, in the output state, the seed laser light is incident on the amplification optical fiber to cause the output unit to emit the laser light, and the pumping light is incident on the amplification optical fiber, and the first fixed period of time, in the pre-pumped state, is shorter than a period from a time when the seed laser light having the small crest value and the pumping light with the predetermined intensity are incident on the amplification optical fiber to a time when a gain of a resonator of the fiber laser device becomes positive.

3. The fiber laser device according to claim 2, wherein the seed laser light emitted from the seed laser light source in the output state is pulsed light, and the seed laser light emitted from the seed laser light source in the pre-pumped state is continuous light.

4. The fiber laser device according to claim 1, wherein an intensity of the pumping light in the pre-pumped state is equal to or lower than an intensity of the pumping light in the output state.

5. The fiber laser device according to claim 2, wherein an intensity of the pumping light in the pre-pumped state is equal to or lower than an intensity of the pumping light in the output state.

6. The fiber laser device according to claim 3, wherein an intensity of the pumping light in the pre-pumped state is equal to or lower than an intensity of the pumping light in the output state.

* * * * *